United States Patent
Himawan et al.

(10) Patent No.: US 9,503,269 B2
(45) Date of Patent: *Nov. 22, 2016

(54) UTILIZING A STAPLING TECHNIQUE WITH A SERVER-BASED CERTIFICATE VALIDATION PROTOCOL TO REDUCE OVERHEAD FOR MOBILE COMMUNICATION DEVICES

(71) Applicant: MOTOROLA SOLUTIONS, INC, Schaumburg, IL (US)

(72) Inventors: Erwin Himawan, Chicago, IL (US); Anthony R. Metke, Naperville, IL (US);
(Continued)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/278,991

(22) Filed: May 15, 2014

(65) Prior Publication Data
US 2015/0372824 A1    Dec. 24, 2015

Related U.S. Application Data

(62) Division of application No. 13/328,334, filed on Dec. 16, 2011, now Pat. No. 9,306,932.

(51) Int. Cl.
*H04L 9/32* (2006.01)
*H04L 29/06* (2006.01)
*H04L 9/00* (2006.01)

(52) U.S. Cl.
CPC .......... *H04L 9/3268* (2013.01); *H04L 9/006* (2013.01); *H04L 9/3265* (2013.01); *H04L 63/0823* (2013.01)

(58) Field of Classification Search
CPC ............ H04L 9/006; H04L 9/3294; H04L 63/20; H04L 63/0442; H04L 9/3281;
(Continued)

(56) References Cited

U.S. PATENT DOCUMENTS 6,134,550 A    10/2000   Van Oorschot et al.
6,865,674 B1    3/2005   Mancini et al.
(Continued)

FOREIGN PATENT DOCUMENTS

WO    2010014314 A2    2/2010

OTHER PUBLICATIONS

CA Security Council_An Introduction to OCSP Multi-Stapling, the CA Security Council, May 7, 2013.*
(Continued)

*Primary Examiner* — Morshed Mehedi
*Assistant Examiner* — Shu Chun Gao (57) ABSTRACT

A certificate issuer (210) can periodically request, receive, and store current server-based certificate validation protocol (SCVP) staples (225) for supported relying parties (205) from at least one server-based certificate validation protocol (SCVP) responder (215). The certificate issuer (210) can receive a contact initiation request (220) from one of the relying parties (205). Responsive to receiving the contact initiation request (220), the certificate issuer (210) can identify a current SCVP staple from the saved staples that is applicable to the relying party (205). The certificate issuer (210) can conveying a response to the contact initiation request (220) to the relying party (205). The response can comprise the identified SCVP staple and a public key infrastructure (PKI) certificate (230) of the certificate issuer. The SCVP staple can validate a certification path between the PKI certificate (230) and a different certificate trusted by the relying party (205).

15 Claims, 5 Drawing Sheets

(72) Inventors: Shanthi E. Thomas, Hoffman Estates, IL (US)

(58) Field of Classification Search
CPC .................. H04L 12/58; H04L 9/3234; H04L 2209/60; H04L 29/06; H04L 9/3202; H04L 9/321; G06Q 20/02; G06F 21/34
See application file for complete search history.

(56) References Cited

U.S. PATENT DOCUMENTS

| | | | |
|---|---|---|---|
| 7,203,753 B2 | 4/2007 | Yeager et al. | |
| 7,290,133 B1 | 10/2007 | Montgomery | |
| 2003/0130947 A1 | 7/2003 | Benantar | |
| 2005/0081037 A1 | 4/2005 | Kumagai et al. | |
| 2005/0228998 A1 | 10/2005 | Chan et al. | |
| 2006/0294576 A1* | 12/2006 | Cross | H04L 63/20 726/1 |
| 2009/0063855 A1* | 3/2009 | Parkinson | H04L 63/20 713/158 |
| 2011/0072270 A1* | 3/2011 | Little | H04L 12/66 713/175 |
| 2011/0231662 A1* | 9/2011 | Sato | H04L 9/3268 713/176 |
| 2013/0117558 A1* | 5/2013 | Metke | G06F 21/33 713/156 |
| 2014/0068251 A1 | 3/2014 | Ignaci et al. | |

OTHER PUBLICATIONS

RFC 6961—The Transport Layer Security (TLS) Multiple Certificate Status Re, Y. Pettersen, Jun. 2013.*

Halappanavar M. et al., "ECPV: Efficient Certificate Path Validation in Public-Key Infrastructure", In: "Data and Applications Security XVII", Jan. 1, 2004 (Jan. 1, 2004), Kluwer Academic Publishers, Boston, XP55086687, ISBN: 978-1-40-208069-2 vol. 142, pp. 215-228.

International Search Report and Written Opinion for counterpart International Application No. PCT/US2013/055930 mailed on Nov. 12, 2013.

Blake-Wilson, S. et al, "Transport Layer Security (TLS) Extensions", Apr. 2006. BCI.

Freeman, T. et al. "Server-Based Certificate Validation Protocol (SCVP)", Dec. 2007, Microsoft Corp.

* cited by examiner

UTILIZING A STAPLING TECHNIQUE WITH A SERVER-BASED CERTIFICATE VALIDATION PROTOCOL TO REDUCE OVERHEAD FOR MOBILE COMMUNICATION DEVICES

CROSS REFERENCE TO RELATED APPLICATIONS

This application is a divisional application, and claims the priority benefit of U.S. patent application Ser. No. 13/328,334 entitled "UTILIZING A STAPLING TECHNIQUE WITH A SERVER-BASED CERTIFICATE VALIDATION PROTOCOL TO REDUCE OVERHEAD FOR MOBILE COMMUNICATION DEVICES, " filed Dec. 16, 2011, incorporated herein by reference it its entirety.

FIELD OF THE DISCLOSURE

The present invention relates generally to digital security certificates, and more particularly to utilizing a stapling technique with the server-based certificate validation protocol (SCVP) to reduce overhead for mobile communication devices.

BACKGROUND

The reliance on digital certificates for authentication is widely used in communication networks. Certificate validation is a resource-intensive process that often impairs operation of resource-constrained communications devices like digital radio communication devices. In situations where the resource-constrained communications device is used in a "mission critical" setting like public safety, this impairment results in unclear or broken communications. As a result, these resource-constrained communications devices offload the certificate validation process to trusted entities.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the invention address applying a stapling technique to an implementation of the server-based certificate validation protocol (SCVP). A SCVP responder can be configured to aggregate SCVP responses for a determined and validated certificate path into a SCVP response for a particular certificate path. The SCVP response can be provided to clients when periodically polled. The client can provide the appropriate SCVP response to a relying party along with the client's PKI certificate when certificate validation is required.

It is well known in the art that a mutual authentication between two clients implies that each of these clients in a Public Key Infrastructure system act as a subject as well as a relying party (RP). For example, when Client A and Client B mutually authenticate each other, it is known in the art that Client A is an RP and Client B is a subject when Client A authenticates Client B. Client A is also a subject and Client B is also an RP when Client B authenticates Client A.

Figure 1:
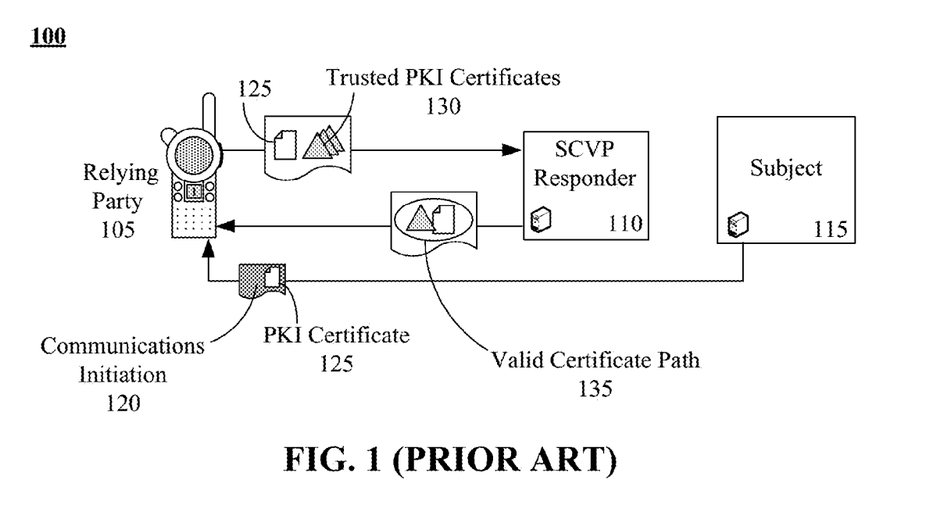
FIG. 1 (PRIOR ART) is functional diagram of a system illustrating the current message flow using the server-based certificate validation protocol (SCVP).

FIG. 1 (PRIOR ART) is a functional diagram of a system 100 illustrating the current message traffic flow using the server-based certificate validation protocol (SCVP). In system 100, a subject (also referred to as a client entity) 115 can send a message 120 to a relying party 105 like a digital radio to initiate communications with the relying party 105.

The relying party 105 and subject 115 can represent a variety of electronic devices, comprised of hardware and/or software elements, configured to utilize SCVP to validate the certificate used for establishing the communication. Within the communication initiation message 120, the subject 115 can provide the relying party 105 with its public key infrastructure (PKI) certificate 125 or other type of digital security certificate.

The relying party 105 can send the client PKI certificate 125 (or other type of subject certificate) along with a list of trusted PKI certificates 130 (or other type of trusted certificate) to the SCVP responder 110. The SCVP responder 110 can be the hardware and/or software components required to perform SCVP operations as defined in RFC 5055.

Generally, the SCVP responder 110 can determine and validate a certificate path 135 between the client PKI certificate 125 and one of the trusted PKI certificates 130 of the relying party 105. The result of the certificate path validation can be sent to the relying party 105, which can then proceed to authenticate the subject 115. When the relying party 105 successfully authenticates the subject 115, the relying party 105 can then proceed communicating with the subject 115.

Figure 2:
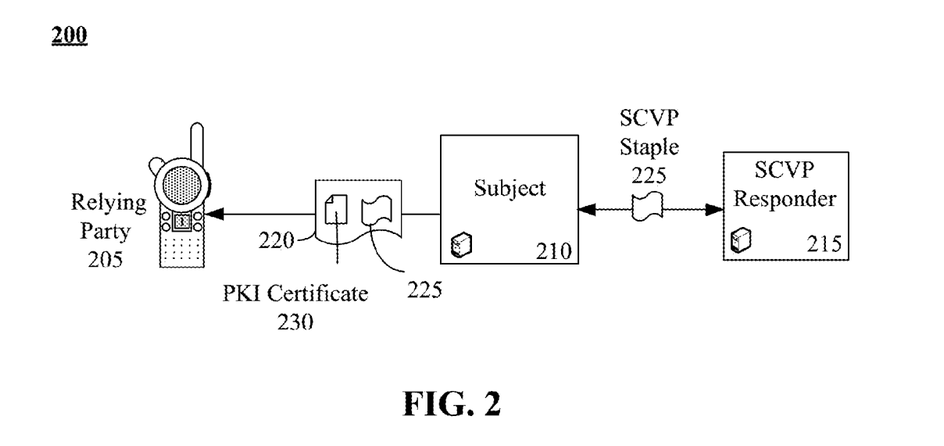
FIG. 2 is a functional diagram of a system that illustrates the use of a stapling technique for the server-based certificate validation protocol (SCVP) in accordance with embodiments of the inventive arrangements disclosed herein.

FIG. 2 is a functional diagram of a system 200 that illustrates the use of a stapling technique for the server-based certificate validation protocol (SCVP) in accordance with embodiments of the inventive arrangements disclosed herein. In system 200, subject 210 can send the relying party 205 a message 220 to initiate communications. The subject 210 functions as a client.

Within the communication initiation message 220, the subject 210 can send the relying party 205 its PKI certificate 230 along with a SCVP staple 225. The communication initiation message 220 is sometimes referred to herein as a contact initiation request. In one embodiment, the message 220 is one that triggers a set of actions to initiate a secure communication, which requires use of a certificate and a validation of the certificate path. The SCVP staple 225 can validate a path between the PKI certificate 230 of the subject 210 and a certificate (not shown) trusted by the relying party 205. The subject 210 can periodically contact the SCVP responder 215 to obtain a current SCVP staple 225. An SCVP staple 225 may be a standard SCVP response, multiple standalone standard SCVP responses, a sequence of SCVP responses, or multiple of sequences of SCVP responses. The standard SCVP response may be associated with certificate path between a subject's certificate and subject's trust anchor certificate, the subject's trust anchor certificate and a relying party's trust anchor certificate, the subject's certificate and the relying party's trust anchor certificate, the subject's certificate and subject's SCVP server certificate, the subject's certificate and relying party's SCVP server certificate, the subject's SCVP server certificate and relying party's SCVP server certificate, or combination of path among subject's certificate, subject's trust anchor certificate, subject's SCVP server certificate, relying party's trust anchor certificate, and relying party's SCVP server certificate.

Contrasting system 200 with system 100 of FIG. 1, the configuration of system 200 can reduce the message traffic handled by the relying party 205 by half. That is the relying party 205 need only communicate with the subject 210 in order to receive all the required information for determining that the subject 210 has a valid certificate and the certificate can be validated to a trusted entity.

The approach of "stapling" is known in the art in conjunction with the online certificate status protocol (OCSP), as defined in RFC 4366. System 200 represents a novel application of the stapling technique for use with SCVP, which is currently unavailable.

Figure 3:
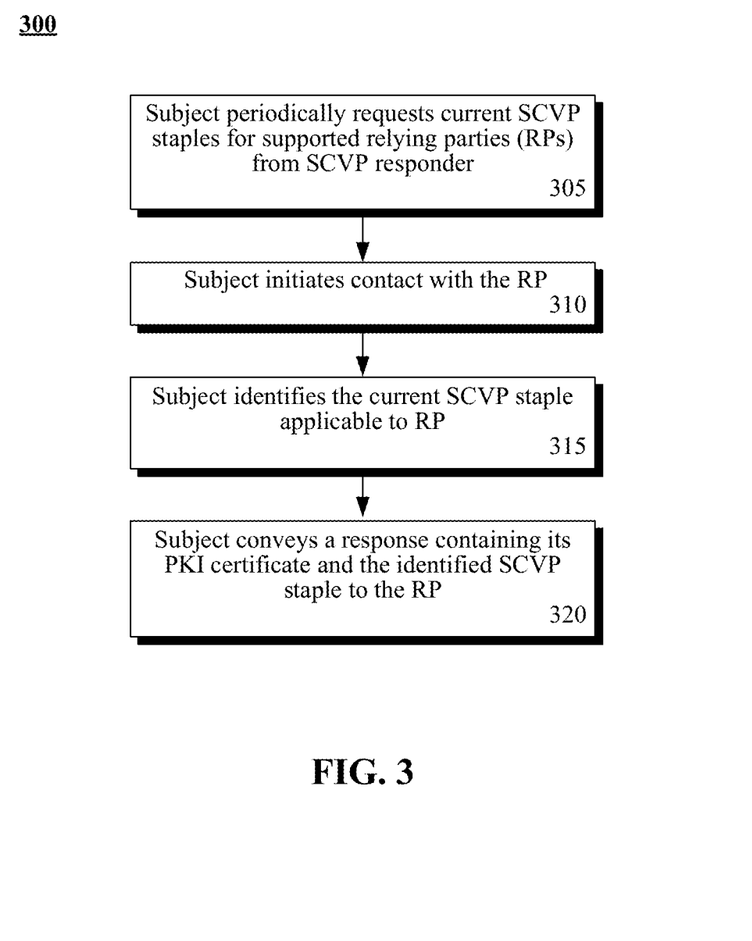
FIG. 3 is a flowchart of a method describing the high-level actions to perform server-based certificate validation protocol (SCVP) stapling in accordance with embodiments of the inventive arrangements disclosed herein.

FIG. 3 is a flowchart of a method 300 describing the high-level actions to perform server-based certificate validation protocol (SCVP) stapling in accordance with embodiments of the inventive arrangements disclosed herein. Method 300 can perform the functions of system 200.

Method 300 can begin in step 305 where the subject can periodically obtain SCVP staples for its supported relying parties from the SCVP responder. Step 305 can be performed at predefined time intervals and/or when a SCVP staple response expires or about to expire.

A subject can initiate communication with the relying party in step 310. In step 315, the subject can identify which of the SCVP staples is applicable to the relying party that the subject is initiating communication to. The subject can then send the relying party its PKI certificate and the identified SCVP staple in step 320.

Thus, the relying party need not spend any additional resources to validate the subject's certificate because the subject can provide the relying party with all the necessary security-related information in its initial request.

Figure 4:
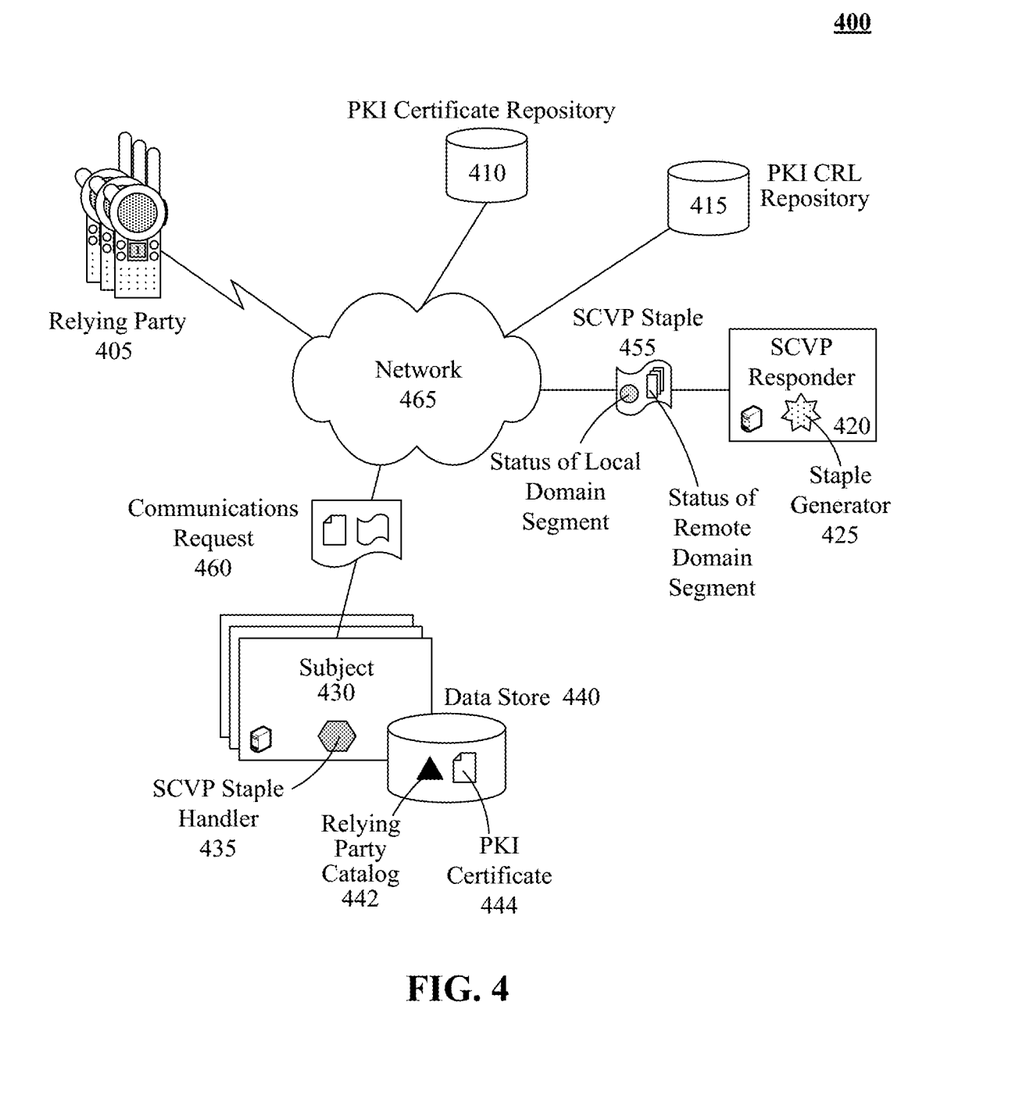
FIG. 4 depicts a schematic diagram of a system that uses server-based certificate validation protocol (SCVP) stapling to reduce resource overhead for a relying party in accordance with embodiments of the inventive arrangements disclosed herein.

FIG. 4 depicts a schematic diagram of a system 400 that uses server-based certificate validation protocol (SCVP) stapling to reduce resource overhead for a relying party 405 in accordance with embodiments of the inventive arrangements disclosed herein. System 400 can perform the steps described in method 300 and/or system 200.

In system 400, a subject 430 can send a message 460 to a relying party 405 over a network 465 in order to initiate communication with the relying party 405. The relying party 405 can represent a variety of electronic devices capable of utilizing SCVP to validate and secure communications made over the network 465 to the subject 430. The relying party 405 can utilize a variety of hardware and/or software configurations, including, but not limited to a two-way radio, a hand-held computing device, a portable data assistant (PDA), a cell phone, a smart phone, a laptop computer, a mobile data terminal (MDT), a communications server, and the like.

The subject 430 can be an electronic device configured to utilize the SCVP stapling process to provide a relying party 405 with a communications request 460 that indicates to the relying party 405 that the subject 430 can be trusted by the relying party 405 by a valid certificate path. For example, the relying party 405 can be Web server being accessed by the subject 430.

To implement the SCVP stapling process, the subject 430 can include a SCVP staple handler 435 and a data store 440 containing a relying party catalog 442 and PKI certificate 444. The PKI certificate 444 can represent the security certificate of the subject 430 that must have a valid certificate path to an entity that is trusted by both the relying party 405 and subject 430.

The relying party catalog 442 can be a list of relying parties 405 that the subject 430 has trust relationship with. Examples of information included in the relying party catalog 442 are Distinguished Name (DN), root suffix, email address, IP address, Fully Qualified Domain Name (FQDN), domain name, Uniform Resource Identifier, and serial number. The catalog 442 can also include list of PKI domains that the subject's PKI domain has trust relationship with. It should be noted that the embodiment of the present invention illustrated in system 400 can represent a communications system where the subject 430 expected to interact with the relying parties 405 is known or able to be predicted.

For example, system 400 can correspond to a public safety communications system where the client entities 430 are assigned or expected to operate in a specific area and interact with the relying parties 405 of that area.

Not all embodiments of the invention require prior knowledge of all relying parties 405 that the subject 430 will interact. In other embodiments, the availability and use of this information can improve the performance of system 400 by allowing the subject 430 to gather the SCVP staples 455 before needed.

The SCVP staple handler 435 can be the software component of the subject 430 configured to maintain a SCVP staple library for the relying parties 405 contained in the relying party catalog 442. The SCVP staple handler 435 can periodically communicate with the SCVP responder 420 over the network 465 to request SCVP staples 455. The SCVP staples 455 received from the SCVP responder 420 can be aggregated to form the SCVP staple library.

The SCVP responder 420 can be the hardware and/or software components necessary to provide the subject 430 with SCVP staples 455. The SCVP responder 420 of system 400 can be similar to a conventional SCVP responder with the addition of a staple generator 425.

The staple generator 425 can be a software component of the SCVP responder 420 configured to create a SCVP staple 455 associated with a relying party 405 when requested by the subject 430. The staple generator 425 can utilize established SCVP methods, such as specified in RFC 3379 (Delegated Path Validation and Delegated Path Discovery Protocol Requirements), and can interact with other known components related with security certificates like the PKI certificate repository 410 and the PKI certificate revocation list (CRL) repository 415.

The staple generator 425 can overcome the inability of a conventional SCVP implementation to support inter-domain systems by segregating the determined certificate validation path and the corresponding SCVP staple 455 associated with the local PKI domain segment and one or more remote PKI domain segments. The local domain segment can represent the portion of the certificate validation path that contains entities located in the same domain (i.e., communications network, system, PKI, Certificate Policy, SCVP) as the subject 430 or SCVP responder 420. The remote domain segment can be the portion containing the entities that are located in a different domain. PKI entities are in the same domain as an SCVP responder when these entities trust this SCVP responder for performing certificate validation operation.

One of the function that staple generator 425 does differently than standard SCVP generator is standard SCVP generator generates an SCVP response comprises of a certificate path between the subject certificate to any of the trusted certificates. In contrast, SCVP staple generator 425 can generate multiple SCVP responses, one for each certificate path between the subject's certificate and the specified trusted certificates.

Information that identifies the remote domain segment can be sent to and handled by the SCVP responder 420 or a trusted anchor, which would convey the remote domain segment to the appropriate SCVP responder 420, of the corresponding remote domain. The information that identifies the remote domain segment can be a sequence of certificates that form a chain between the subject certificate to the subject's trust anchor; or a set of certificates indicating the starting and ending points of a certificate path. The SCVP responder 420 of the remote domain would then validate and return the remote domain segment to the SCVP responder 420 of the originating SCVP responder 420.

For example, Domain A SCVP responder 420 can determine the local domain segment for Domain A and a remote domain segment for Domain B. The Domain A SCVP responder 420 can validate the local domain segment and request the remote domain segment from the Domain B SCVP responder 420. The Domain B SCVP responder 420 can then validate the segment and return the result to the Domain A SCVP responder 420, which can then combine the local and remote domain segments and into the SCVP staple 455.

Further, this SCVP stapling technique can be used when the relying party 405 is unable to communicate with the SCVP responder 420, which is a limitation of conventional SCVP implementations. Referring back to system 100 of FIG. 1, the relying party 105 cannot validate the subject 155 when the SCVP responder 110 is unavailable (i.e., offline).

In the SCVP stapling technique illustrated in systems 200 and 400, the unavailability of the SCVP responder 420 can have a minimal impact on the relying party 405 because the relying party 405 does not directly interact with the SCVP responder 420. Since the SCVP staple 455 has a predetermined "life-span" based upon when it was received by the subject 430, the subject 430 can continue to provide a relying party 405 with the SCVP staple 455 until it expires even if the subject 430 loses communication with the SCVP responder 420. The SCVP life-span can be indicated by expiration date, start time and end time, counters, time duration.

Should the communication loss with the SCVP responder 420 surpass the expiration life-span of the SCVP staple 455, the subject 430 can provide the expired SCVP staple 455 to the relying party 405 along with an indication that the SCVP responder 420 is unavailable. The relying party 405 can then be responsible for determining whether or not to accept the expired SCVP staple 455. Such a decision can be based upon conditions like the relying party's 405 past history with the subject 430 and how long the SCVP staple 455 has been expired. It can also be based on relying party local policy. The local policy includes other constraints such as name, policy ID, expiration date, how long to cache status information which can be used to determine if the subject's certificate is acceptable by the relying party for the given application or the requested service.

Figure 5:
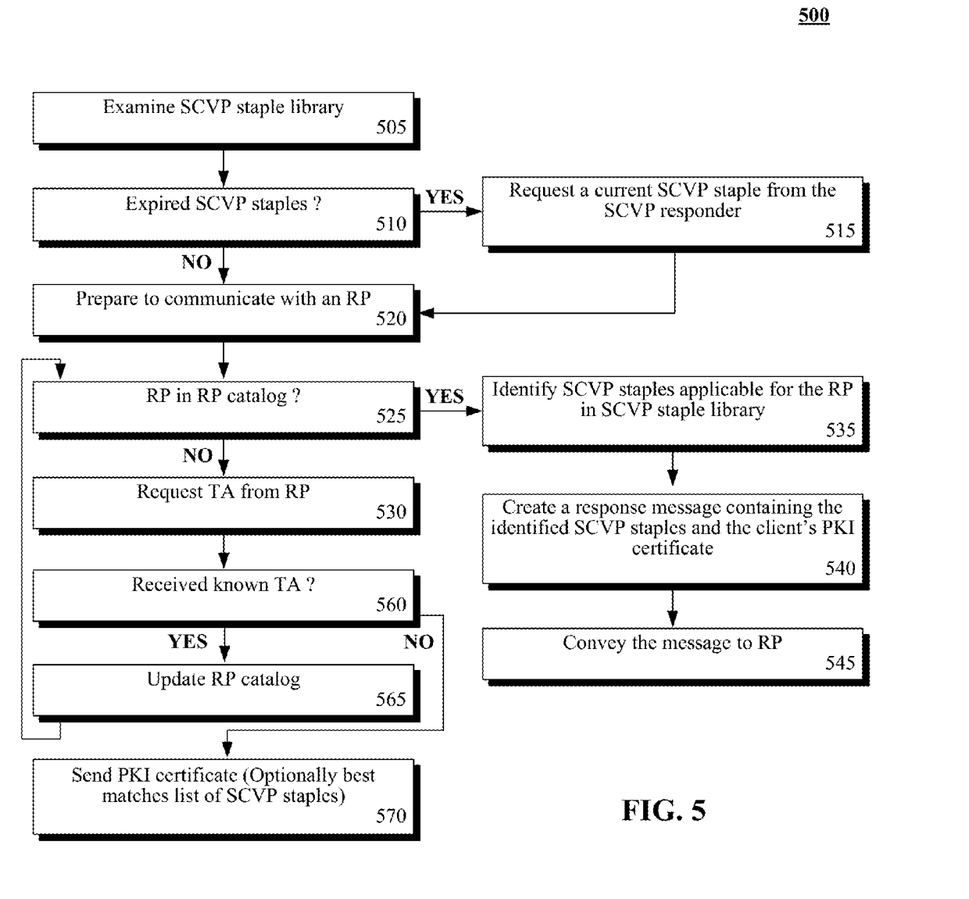
FIG. 5 is a flowchart of a method describing actions performed by the SCVP staple handler to implement SCVP stapling in accordance with embodiments of the inventive arrangements disclosed herein.

FIG. 5 is a flowchart of a method 500 describing actions performed by the SCVP staple handler to implement SCVP stapling in accordance with embodiments of the inventive arrangements disclosed herein. Method 500 can be performed within the context of system 400 and/or system 200 and/or in conjunction with method 300.

Method 500 can begin in step 505 where the SCVP staple handler can examine the SCVP staple library. It can be determined in step 510 if the SCVP staple library contains expired SCVP staples.

When the SCVP staple library contains an expired SCVP staple, the SCVP staple handler can request a current SCVP staple from the SCVP responder in step 515. After execution of step 515 or when the SCVP staple library is determined to not contain expired SCVP staples, step 520 can execute where the subject prepares communication with the relying party.

In step 525, it can be determined if the relying party that the subject is going to communicate with is listed in the relying party catalog. When the relying party is not listed in the relying party catalog, the subject may obtain list of certificates trusted by the RP in step 530.

In step 560, the subject then matches the attributes of RP's trusted certificates with a set of criteria. When the subject finds a match between the attributes of the trusted certificates and this set of criteria, the subject updates the RP catalog in step 565. This set of criteria may include domain name, hash of certificates, Distinguished Name (DN), IP addresses, Fully Qualified Domain Name (FQDN). A match between the attributes of RP's trusted certificate and these criteria does not imply that they are identically equal. The subject could implement at least one predefined rule that determines what is considered as a match and what is not considered as a match. For example, the rule may indicate that trusted certificates' attribute within a predefined range is considered a match with one of these criteria; trusted certificates' attribute below or above a certain threshold is considered a match with these criteria; a parameter with a particular bit-set is considered a match with the attributes in the trusted certificate; and/or the presence or absence of a certain limiting parameter is considered a match with the attributes in the trusted certificate.

In step 570; when any of the attributes of RP's trusted certificates does not match with the subject's acceptable attributes, the subject then provides its PKI certificate. The subject may optionally provide one or multiple SCVP staples that best matches with the attributes of RP's trusted certificate.

When the relying party is listed in the relying party catalog, step 535 can be performed where the SCVP staple handler can identify the SCVP staples applicable to the relying party in the SCVP staple library. A response message can then be created containing the identified SCVP staples and the PKI certificate of the subject in step 540. The response message can then be conveyed to the relying party in step 545.

Figure 6:
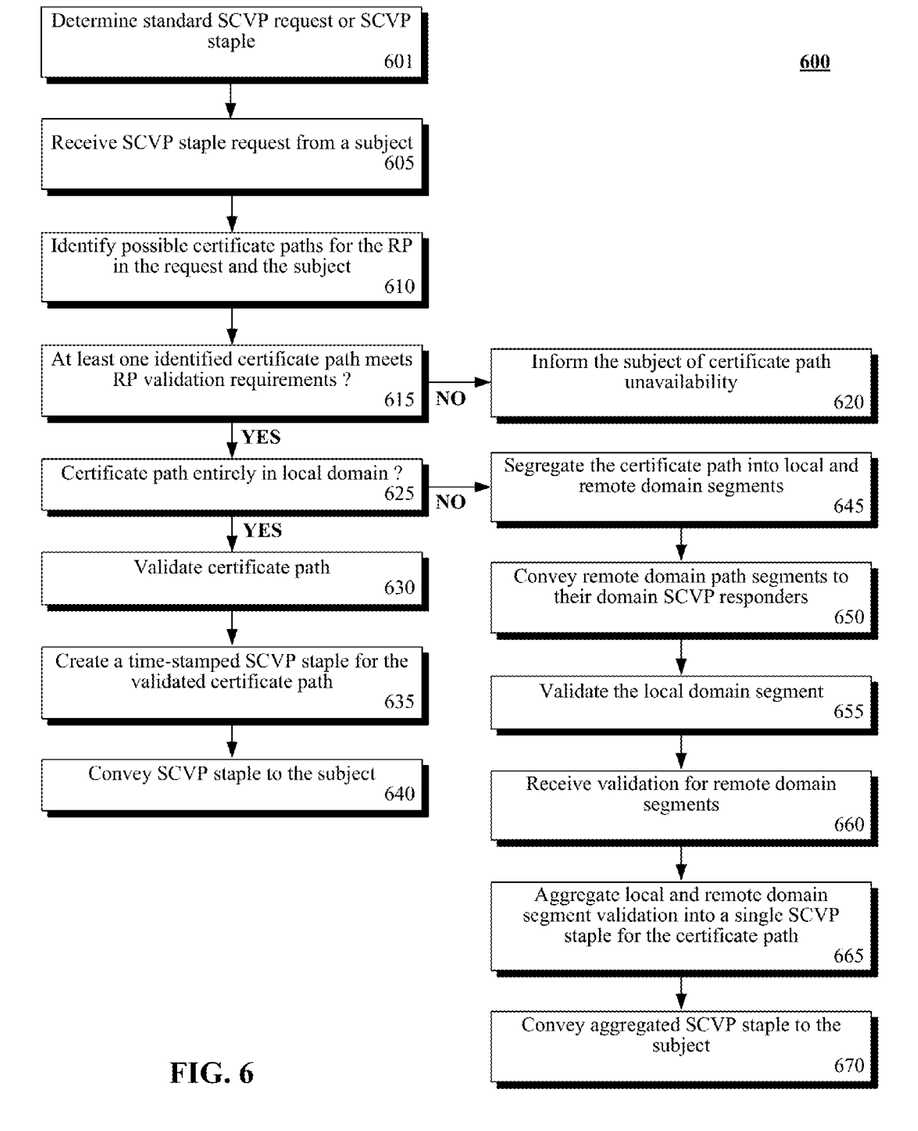
FIG. 6 is a flowchart of a method depicting the actions performed by the SCVP responder to implement SCVP stapling in accordance with embodiments of the inventive arrangements disclosed herein.

FIG. 6 is a flowchart of a method 600 depicting the actions performed by the SCVP responder to implement SCVP stapling in accordance with embodiments of the inventive arrangements disclosed herein. Method 600 can be performed within the context of system 400 and/or system 200 and/or in conjunction with methods 300 and/or 500.

Method 600 can begin in step 601 where the SCVP responder determines whether it receives a request for standard SCVP or SCVP staples. The responder first identifies the entity requesting the SCVP response, the certificate to be validated, and the trusted certificate to use for validating the to be validated certificate. When the entity requesting the SCVP response and the entity in the certificate to be validated are equivalent, the responder determines that the request is for SCVP staple. The entity requesting the SCVP response and the entity in the certificate to be validated are equivalent when attributes or credentials associated with the requesting entity's identity, privileges, or roles matches with the attributes, credentials, privileges, or roles of the subject in the certificate to be validated. Then, the responder needs to determine the information that needs to be included in the SCVP staple. First, the responder examines whether the trusted certificate specified in the request is part of the PKI domain of the certificate to be validated. In one embodiment, if the trusted certificate is part of the PM domain of the certificate to be validated, the SCVP staple is a standard SCVP response. This SCVP response validates the certificate path between the certificate to be validated and the specified trusted certificate. If the trusted certificate is not part of the PKI domain of the certificate to be validated, then the SCVP staple may include multiple standard SCVP responses. The first standard SCVP response is for the path between the certificate to be validated and the trusted certificates of the PKI domain of the certificate to be validated. The trusted certificates of the PKI domain of the certificate to be validated may be a self signed CA certificate (root CA), or other trusted CA certificates. The second SCVP response is for the path between the trusted certificates of the PKI domain of the certificate to be validated and the trusted certificates specified in the request.

In alternate embodiment, if the requestor is the subject of the certificate to be validated, then the SCVP staple can include multiple SCVP responses, one for each path to the trusted certificates.

In one embodiment, a single SCVP response can contain the id of a certificate subject, and a list of trusted certificates for which there is a validated path between the subject's certificate and the trusted certificates. A certificate subject id may include an X500 Distinguished Name, or a certificate serial number, an IP address or a Fully Qualified Domain Name, Uniform Resources Identifier, etc. A list of trusted certificates can include the id of the trusted certificate, as well as constraints or policy mapping attributes applied to the trust path associated with a given trusted certificate. Where policy mapping attributes include a set of policy ids from one domain that are equivalent to a policy id from another domain.

In step 605 where the staple generator can receive a SCVP staple request from a subject. The possible certificate paths for the relying party in the request and the subject can be identified in step 610. In step 615, it can be determined if at least one of the identified certificate paths meet the validation requirements (e.g., path length) of the relying party.

When none of the identified certificate paths meet the validation requirements, the staple generator can inform the subject that a valid certificate path is unavailable in step 620. When at least one of the identified certificate paths meet the validation requirements, step 625 can be performed where it can be determined if the identified certificate path is entirely contained within the domain local to the SCVP responder.

When the certificate path is entirely in the local domain, the certificate path can be validated in step 630. In step 635, a time-stamped SCVP staple can be created for the validated certificate path. The SCVP staple can be conveyed to the subject in step 640.

When the certificate path is not entirely in the local domain, the staple generator can segregate the certificate path into local and remote domain segments in step 645. In step 650, the remote domain segments can be conveyed to their domain SCVP responders.

The local domain segment can be validated in step 655. In step 660, validation for the remote domain segments can be received. The local and remote domain segment validation information can be aggregated into a single SCVP staple for the certificate path in step 665. In step 670, the aggregated SCVP staple can be conveyed to the subject.

It should be noted that method 600 can illustrate a simple example of SCVP stapling that can be handled by the staple generator. The staple generator can include additional instructions to handle more robust situations such as when a remote domain segment is not returned or is unable to be validated by the remote domain SCVP responder.

From the above, it is evident that the disclosure provides a stapling technique, which reduces overhead for mobile communication devices. This overhead is reduced as the mobile communication device (relying party) no longer has to establish and validate a certificate path through sending a series of messages and receiving responses to each entity in the certificate path. Instead, the certificate subject takes on a substantial portion of this burden for the relying party. That is, the certificate subject can periodically request SCVP staples for supported relying parties. This information is maintained by the certificate subject and can be used to validate the certificate path. Thus, the disclosure conserves bandwidth, which is often a significant limitation from the relying party, which can be connected to a narrowband network. Further, the disclosure minimizes processing cycles that the relying party is responsive for, compared to conventional validation techniques, which can be significant as many relying party devices are severely resource constrained devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for validating a certificate path between a current relying party and a subject, the method comprising:
    at the subject:
        receiving at least one first certificate trusted by at least one relying party, wherein the at least first certificate and a subject certificate are in different PKI domains;
        requesting, from an SCVP (Server-based Certificate Validation Process) server, an SCVP response for the subject certificate;
        receiving, an SCVP staple, from the SCVP server in response to the requesting, the SCVP staple validating a certificate path between the subject certificate and the at least one first certificate;
        storing the received SCVP staple in an SCVP staple library comprising stored SCVP staples;
        identifying an SCVP staple from the SCVP staple library applicable to the current relying party; and
        the subject transmitting the identified SCVP staple to the current relying party.

2. The method of claim 1, wherein the at least one relying party is the current relying party.

3. The method of claim 1, further comprising validating a certificate path between the subject certificate and at least one second certificate in a PKI domain of the subject using a first SCVP response of the SCVP staple.

4. The method of claim 3, further comprising validating a certificate path between the at least one second certificate path and the at least one first certificate path using a second SCVP response of the SCVP staple.

5. The method of claim 1, comprising receiving the at least one first certificate from the at least one relying party.

6. The method of claim 1, further comprising validating the authenticity and integrity of the SCVP staple by the current relying party.

7. The method of claim 1, further comprising:
    building a certificate path between a trust anchor of the subject and the SCVP server by the SCVP server;
    signing the SCVP response by the SCVP server, when the built certificate path is determined as valid by the SCVP server.

8. The method of claim 1, further comprising:
    periodically requesting, receiving and storing SCVP staples for supporting communication with relying parties; and
    initiating a contact request to the current relying party.

9. The method of claim 8, wherein the requesting, receiving, and storing of the SCVP staples by the subject reduces message traffic, contact initiation latency, and processing requirements at the relying party over other processes where the subject does not utilize SCVP staples.

10. The method of claim 8, wherein by the current relying party receiving the subject certificate and the SCVP staple from the subject, the current relying party needs to only communicate via the contact initiation request in order to receive all the required information for determining that the subject has a valid subject certificate provided by an entity trusted by the current relying party.

11. The method of claim 8, wherein each of the SCVP staples that are stored by the subject comprise status for two or more segments, wherein said two or more segments comprise a local domain segment and one or more remote domain segments, wherein each of the local domain segment and the remote domain segments validates a corresponding portion of an end-to-end certification path.

12. An apparatus for authenticating a certificate path between a subject and a
   current relying party, the apparatus comprising:
      at least one relying party operative to transmit at least one first certificate to a subject, wherein the at least one first certificate and a subject certificate are in different PKI domains;
      an SCVP server operative to transmit an SCVP (Server-based Certificate Validation) staple, in response to a request from the subject, wherein the SCVP staple validates a certificate path between the subject and the at least one relying party;
      the subject operative to receive the SCVP staple and further store the SCVP staple in an SCVP staple library, the subject further operative to identify an SCVP staple from the SCVP staple library applicable to the current relying party and to transmit the identified SCVP staple to the current relying party.

13. The apparatus of claim 12, wherein the at least one relying party is the current relying party.

14. The apparatus of claim 12, wherein the SCVP staple comprises a first SCVP response that validates a certificate path between the subject certificate and at least one second certificate in a PKI domain of the subject.

15. The apparatus of claim 14, wherein the SCVP staple further comprises a second SCVP response that validates a certificate path between the at least one second certificate and the at least one first certificate.

\* \* \* \* \*